No. 678,632. Patented July 16, 1901.
E. P. BAIRD.
TOLL APPARATUS FOR TELEPHONES.
(Application filed July 2, 1900.)
(No Model.) 4 Sheets—Sheet 1.

Witnesses:
Torris H. Words
Arthur J. Roehle

Inventor:
Edward P. Baird.
By Fred Gerlach,
his Attorney.

THE NORRIS PETERS CO., PHOTO-LITHO., WASHINGTON, D. C.

No. 678,632. Patented July 16, 1901.
E. P. BAIRD.
TOLL APPARATUS FOR TELEPHONES.
(Application filed July 2, 1900.)
(No Model.) 4 Sheets—Sheet 2.
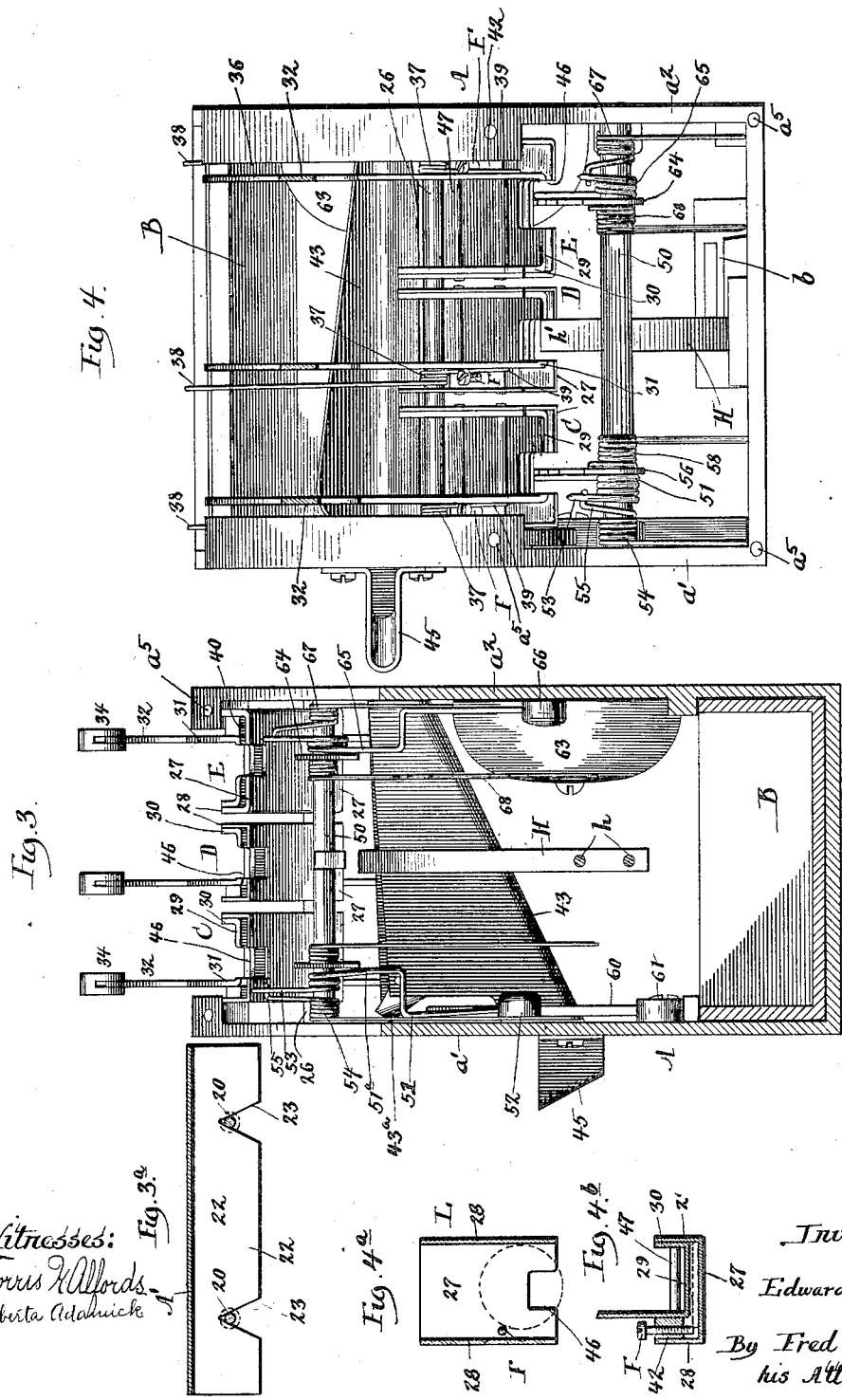

No. 678,632. Patented July 16, 1901.
E. P. BAIRD.
TOLL APPARATUS FOR TELEPHONES.
(Application filed July 2, 1900.)
(No Model.) 4 Sheets—Sheet 3.
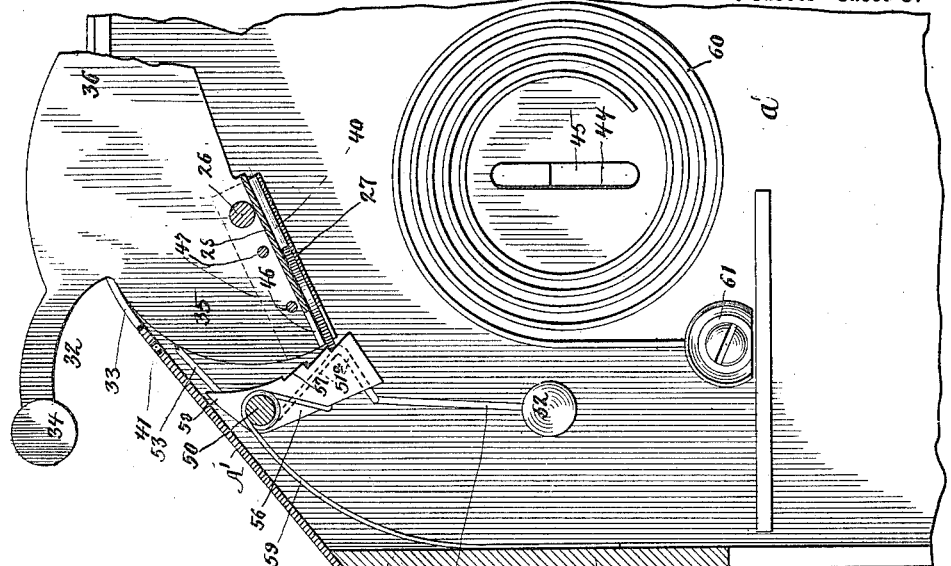
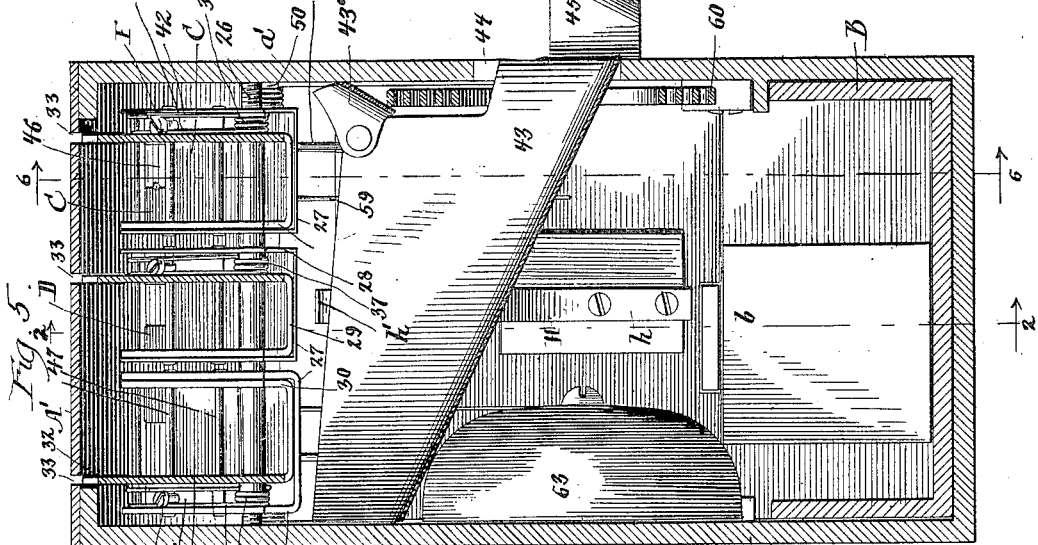
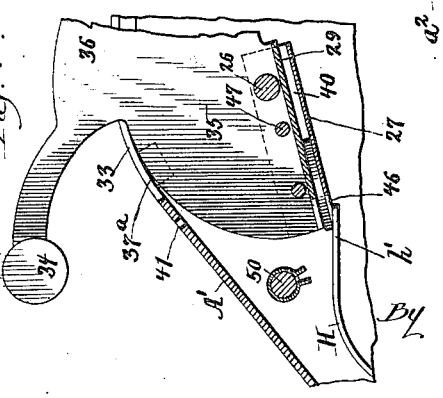
Witnesses:
Frank S. Blanchard
Torris K. Alfords
Inventor:
Edward P. Baird
By Fred Gerlach
his Attorney No. 678,632. Patented July 16, 1901.
E. P. BAIRD.
TOLL APPARATUS FOR TELEPHONES.
(Application filed July 2, 1900.)
(No Model.) 4 Sheets—Sheet 4.
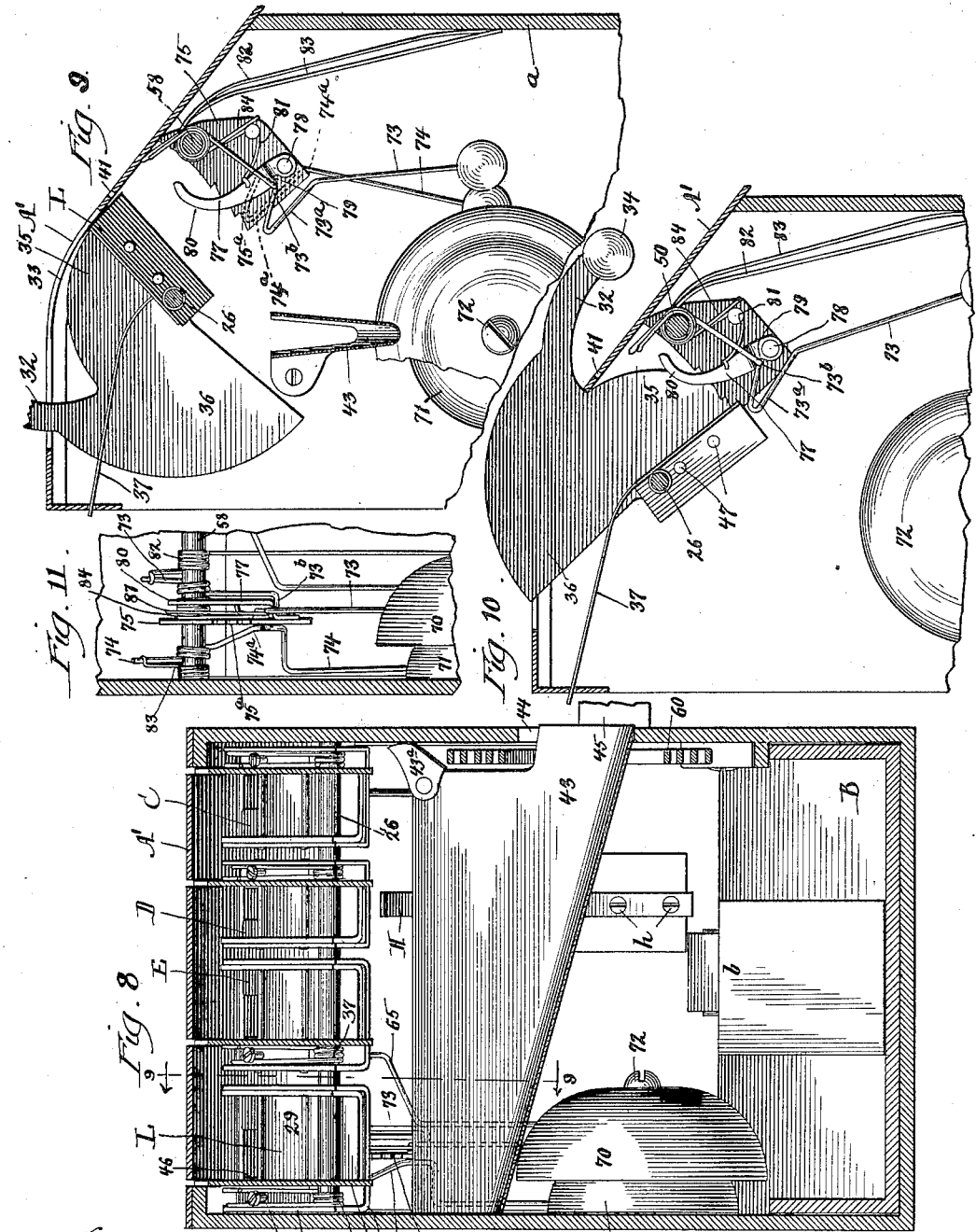
Witnesses:
Frank S. Blanchard
Torris ? Alfords
Inventor:
Edward P. Baird
By Fred Gerlach
Attorney.

UNITED STATES PATENT OFFICE.

EDWARD P. BAIRD, OF EVANSTON, ILLINOIS, ASSIGNOR TO THE BAIRD MANUFACTURING COMPANY, OF CHICAGO, ILLINOIS.

TOLL APPARATUS FOR TELEPHONES.

SPECIFICATION forming part of Letters Patent No. 678,632, dated July 16, 1901.

Application filed July 2, 1900. Serial No. 22,243. (No model.)

*To all whom it may concern:*

Be it known that I, EDWARD P. BAIRD, a resident of Evanston, in the county of Cook, State of Illinois, have invented certain new and useful Improvements in Toll Apparatus for Telephones, of which I do declare the following to be a full, clear, and exact description.

The present invention relates to that class of devices used in connection with pay-station telephones for receiving the tolls and in which means are provided by which the operator at the central station may be notified of the payment of the toll.

The present invention designs to provide an improved toll-receiving device for telephones which is simple in construction and efficient and positive in operation; and the invention consists in certain novel features hereinafter described, and more particularly defined by claims at the conclusion hereof.

Figure 2:
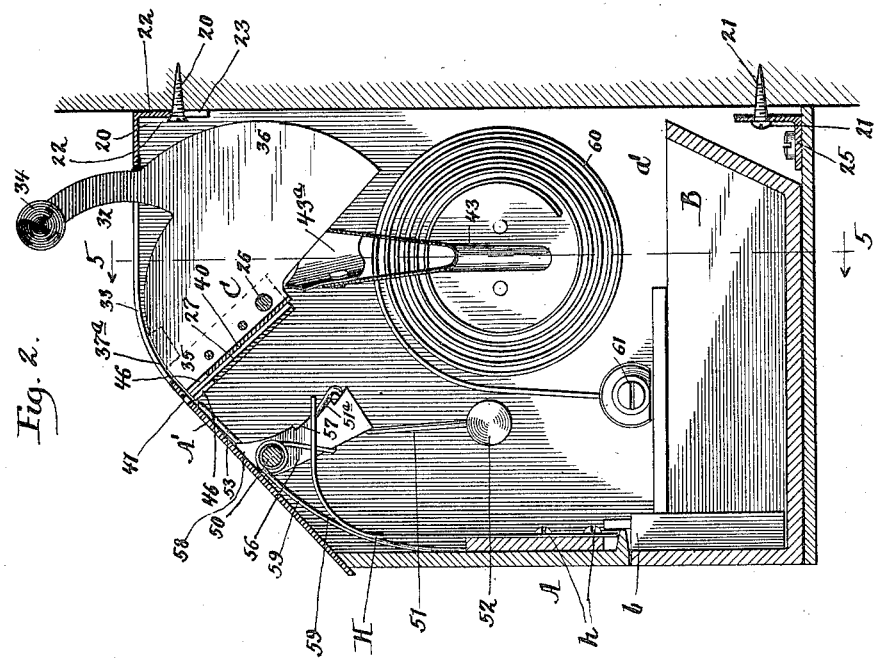
Figure 1:
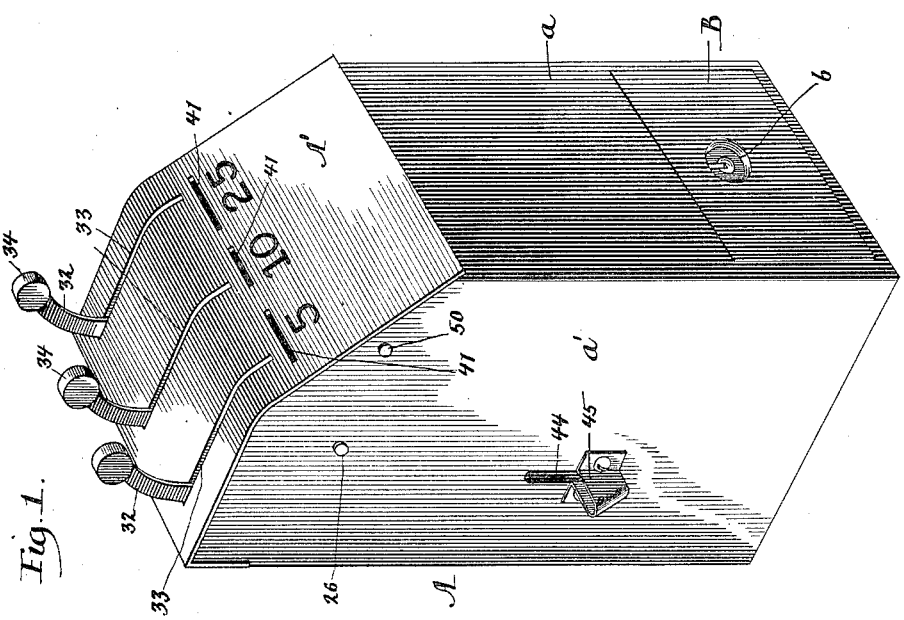

In the drawings, Figure 1 is a perspective view of a device embodying certain features of the invention. Fig. 2 is a view in vertical longitudinal section, taken on line 2 2 of Fig. 5. Fig. 3 is a front view, the case being shown partly in section and the top plate removed. Fig. 3$^a$ is a detail view showing the depending portion of the top plate. Fig. 4 is a plan view, the top plate being removed. Fig. 4$^a$ is a detail view, in horizontal section, of a carrier and coin-stop therein. Fig. 4$^b$ is a detail view, in cross-section, of one of the carriers. Fig. 5 is a view, on an enlarged scale, in a vertical transverse section, on line 5 5 of Fig. 2. Fig. 6 is a view in vertical longitudinal section similar to Fig. 2, upon an enlarged scale, and showing a coin in the carrier and the carrier in depressed position. Fig. 7 is a detail view, in vertical longitudinal section, showing one of the carriers with a coin therein in depressed position and engaging the "buzzer." Fig. 8 is a view in vertical transverse section of an apparatus embodying certain features of the invention and applied to mechanism adapted to receive coins of four different denominations and embodying also a modified form of signal mechanism. Fig. 9 is a view in vertical longitudinal section on line 9 9 of Fig. 8. Fig. 10 is a similar view showing one of the coin-carriers in depressed position. Fig. 11 is a detail back view of the signal-operating device shown in Figs. 8 to 10.

A denotes an inclosing casing comprising a front wall $a$, side walls $a'$ and $a^2$, and a cover-plate A', which is affixed to the case. The cover A' is secured to the case by screws $a^5$, which are extended into the cover from the inside of the case, so the cover cannot be removed when the case is attached to a support. In practice the case is usually secured to a back board or other part of a telephone with which a transmitter is connected to cause audible signals to be conducted through the transmitter and over the line to the operator at the central station. The case is usually secured to a back board or other support by screws 20 and 21. The cover-plate A' is extended downwardly, as at 22, and provided with V-shaped notches 23, which fit snugly over screws 20 to securely hold the upper portion of the case to the support. Screws 21 are extended through angular cross-strips or plates 25, secured to the bottom of the case. In applying case A to a support the screws 20 are first driven into the support in position to fit into notches 23 in strip 22 of cover-plate A'. The case will then be placed and held in position against the support. Screws 21 will then be secured in the support, and the case will then be securely held in the desired position against the support. Cross-strip 24 is preferably located behind the coin receptacle or drawer B, and the tool for securing screws 21 may be inserted through the drawer-opening. Thus it will be seen that the case cannot be removed from its support except when the coin-drawer has been withdrawn from the case. Such construction is simple, serves to securely hold the case against the support, and prevents the removal of the case, except when the drawer has been unlocked by authorized persons.

Within the case a series of coin-carriers are provided which correspond in number with the different denominations of the coins which are to be accepted in payment of tolls. In the construction shown in Figs. 1 to 7 a series of three carriers are employed to receive coins or tokens of different denominations or sizes—for example, a carrier C to receive a five-cent piece, a carrier D for a dime, and a carrier E for a twenty-five-cent piece. Each of these carriers is designed to receive a coin and operate a signal distinctively different in character to avoid the possibility of error on the part of the operator at the central station in noting the signals and determining the denominations of the coins deposited. For such purpose a gong is arranged to be actuated by carrier C. Carrier D actuates a buzzer, and the carrier E is designed to actuate a bell. By employing signals which are distinctively different in character it will be easy for the operator to clearly distinguish between the signals and to determine the denomination of the coin or coins deposited. An objection incident to prior constructions in which bells of different tones were used and those in which a repetition of signals was employed to distinguish the denominations of the coins has been that the operator would sometimes fail to distinguish the signals. Each of the carriers is pivotally sustained upon a cross-shaft 26, which is secured in the side walls of the case. Each carrier comprises a bottom 27, having upwardly-bent sides 28, through which the cross-shaft 26 is extended, and a top plate 29, having its sides also bent upwardly, as at 30 and at 31, through which the cross-shaft is also extended. The carriers are pivotally held upon said cross-shafts. Sides 31 of the top plates 29 of the carriers are extended upwardly to form levers 32, which project through slots 33, formed in the top plate of the case. Each lever 32 is provided with a suitable finger-piece 34. Levers 32 are formed with wings 35 and 36, which serve to close slots 33 at all times to prevent the insertion of a coin or slug either when the carrier is in normal or depressed position, and it will be seen also that wings 35 prevent a coin or slug from being slipped through slots 41 when the corresponding carrier is not in normal position. Such construction not only prevents a token from being inserted through a slot 33 to operate a signal, but also prevents a coin from being inserted through slots 41 when the corresponding carrier is not in normal position. A coil-spring 37 on cross-shaft 26 is conveniently placed between the side flanges of each carrier, and one terminal thereof is extended rearwardly to engage the back of the case, as at 38, and its other terminal 39 is extended forwardly to engage a part of the carrier. Such springs retain the carriers in normal position against fixed stops 37$^a$, as shown in Fig. 2 of the drawings, and restore the carrier to normal position. Between the bottom 27 and top 29 a coin channel or guide 40 is formed. Normally each carrier is inclined, and the front or upper portion of each coin-channel is in position to receive a coin through a coin-slot 41, formed in top plate A' of the case. Between the slides 30 and 31 of the top plate of the carrier and sides 28 of the bottom of the carrier a strip 42 is secured. A stop F extends through a threaded perforation in strip 42 and has its lower end projected into the coin-channel 40 in position to retain a coin of sufficient thickness in proper position in the coin-channel in the carrier. By adjusting the stop-screw F the thickness of a coin which is to be accepted in payment of tolls and which will operate a signal can be determined to a nicety. Stop F is located adjacent one of the sides of the carrier and in position to be engaged by the side portion of a coin of proper diameter. By such arrangement of the stop a coin of smaller diameter will not be retained in the coin channel or guide but will pass therethrough and be rejected.

The lower end of coin-channel 40 is open, so a coin which is of insufficient thickness or diameter to be retained by the stop F can pass therethrough. A runway 43 is located in convenient position beneath the coin-channels in the carriers, and into such runway the rejected coins will pass and be directed through a slot 44 in one of the side walls of the case into a cup or receiver 45, secured to the outside of the case. A deflector 43$^a$ directs rejected coins away from gong 60. Thus it will be seen that coins or slugs insufficient in thickness to be held in the carrier will pass through the carrier into runway 43 and thence to the outside of the case, and thus refunded to the depositor of the telephone. The purpose of this construction is to provide a device in which only coins or tokens of acceptable size will be retained to operate a signal and in which defective coins or slugs will be rejected and returned to the depositor. This construction is a very important one, because no injustice can be done to the user of the telephone when a coin is inserted which is defective.

The top and bottom walls 27 and 29 of the carrier are cut away or notched, as at 46, to expose a sufficient portion of a coin therein for engagement with a signal device. The stop F is in proper position to retain a coin in proper position in the carrier to cause the portion of a coin adjacent to its edge to engage the operating part of one of the signal devices. The carriers are held normally in an inclined position, so that when a coin is deposited therein it will rest upon the bottom of the carrier and pass through the coin-slot 40 unless it is of sufficient thickness to be retained by the stop F. The carriers may also be provided with cross-ties 47. The purpose in forming the carrier with notches 46 is to cause the carrier to securely hold a coin and expose the edge of the coin to engage the operating part of a signal device.

The operation of the parts thus far described is as follows: If a coin of proper size is inserted through one of the coin-slots 41, it will pass into the corresponding carrier between the top and bottom plates thereof and be held in position by stop F. The user of the telephone will then draw corresponding lever 32 forwardly, and such shift of the lever will cause the carrier and the coin therein to travel downwardly to effect the operation of a signal in a manner which will be hereinafter more fully described.

It will be understood that the carriers C, D, and E are similar in construction, except that they are formed of a width corresponding substantially to the diameter of a particular coin which the carrier is designed to receive and retain. It has not therefore been deemed necessary to describe each of the carriers separately in detail.

A cross-rod 50 is secured in the sides of the case in front of carrier C, and on said rod the levers for operating the signals are held. Preferably the signals are distinctively different in character to enable the operator to clearly distinguish between the signals, and thus determine the character of the coin deposited. Opposite notch 46 in carrier C is arranged a lever 51, to the end of which a striker 52 is secured. Lever 51 is preferably formed of wire, which encircles cross-shaft 50, and is provided with an arm 53, projected upwardly, to engage the top plate A'. A spring 54, having one end resting against the case and its other end bent in position to engage arm 53 of the striker-lever, as at 55, serves to hold the striker 52 and lever 51 in normal position. (Shown in Fig. 2 of the drawings.) Lever 51 is bent, as at $51^a$, to form an arm arranged in position to be engaged by a coin in carrier C. At the side of the striker-lever and upon cross-shaft 50 a dog 56 is pivotally held. The inner edge of said dog is provided with a series of teeth 57, arranged in position to be engaged by a coin in carrier C. The dog 56 is extended upwardly, as at 58, to engage the top of the case, as at A', and a spring 59 serves to hold said dog in position in the path of movement of a coin in the carrier, but permits the dog to yield sufficiently to cause the coin to slip beneath the teeth 57 of the dog when a coin and carrier are moved downwardly. The teeth 57 are arranged to engage a coin in carrier C before such coin engages the striker-lever 51, and thus prevent the carrier from being retracted to repeatedly operate the striker. A gong 60 is secured to side A' of the case, as at 61, and in position to be actuated by striker 52. The operation of this signal device will be as follows: Assuming a coin of proper size to have been deposited through coin-slot 41 opposite carrier C, it will be held in said carrier by stop F. A coin of proper size will be held with its front or upper edge—i. e., the exposed portion of the coin adjacent notch 46 of the carrier—in position to engage teeth 57 of dog 56 and arm $51^a$ during the shift of the carrier. Such depression of the coin and carrier will shift the lever 51 and striker 52 against the force of spring 54 until the coin passes beneath the dog 56 and arm $51^a$ of lever 51, when the coin will gravitate from the carrier and be discharged into the coin-drawer. As soon as the coin passes beneath arm $51^a$ lever 51 and striker 52 will be shifted backwardly by spring 54 and actuate gong 60. Such signal will be conducted through the support to which case A is secured to the transmitter of the line and thence to the operator at the central station. Spring 37 will return the carrier to its normal position.

The signal device for notifying the operator that a coin of the proper size has been deposited in carrier D consists of a flexible strip H, of metal, having one of its terminals secured to the front wall of the case, as at $h$, and having a free terminal $h'$ bent into position to be engaged by a coin in carrier D when such carrier is depressed. The operation of this signaling device is as follows: As carrier D is depressed the edge of the coin will engage the free terminal $h'$ of the flexible strip H and distend such strip until the coin is depressed sufficiently to pass beyond the terminal, when the flexible strip will be suddenly released, and the inherent elasticity will cause it to vibrate. Such vibration will give an audible signal similar to that given by the familiar buzzer, thus notifying the operator at the central station that a coin of proper size has been deposited in carrier D.

The signal device operated by a coin in carrier E is similar to that operated by the carrier C, except that a bell 63 is arranged in position to be operated by the striker. The construction of the signal-operating mechanism for bell 63 comprises a dog 64, a striker-lever 65, a striker 66, spring 67 for returning the striker and lever to normal position, and a spring 68 for holding the dog 64 normally in the path of movement of a coin in carrier E. The construction and arrangement of these parts are similar to those already described as operated by a coin in carrier C, and it has not therefore been deemed necessary to describe and illustrate the details thereof more fully. It will be understood, however, that when a coin of sufficient diameter has been deposited in carrier E and carrier is depressed dog 64 and striker-lever 65 will cause striker 66 to be brought in contact with the bell 63 to thus notify the operator at the central station that a coin of sufficient diameter and thickness has been deposited in carrier E.

From the construction of the signals and operating mechanism thus far defined it will be seen that the operator at the central station will be notified by signals distinctively different in character of the denomination of the coin deposited.

The drawer B is provided with a lock $b$ of usual construction and may be withdrawn when the coins are to be removed from the case.

It will be understood that the several features of the invention may be employed in apparatus adapted to receive either one or any desired number of coins of different denominations, and in Figs. 8 to 11 of the drawings I have shown a construction in which an additional carrier is employed which is adapted to receive and shift a somewhat-larger coin—e. g., a fifty-cent piece. A modified form of a signal-operating device is also shown in such figures.

Referring now more particularly to Figs. 8 to 11, the signal-operating mechanism therein shown is designed to produce a duplex signal. L denotes a carrier similar to those hereinbefore defined. 70 and 71 denote bells secured upon a stud 72, projecting from one of the side walls of the case. 73 and 74 denote levers which are pivotally sustained upon cross-rod 58. A dog 75, provided with a series of teeth 75$^a$, is pivotally sustained by a cross-rod 58. The lever 74 is provided at its lower end with a striker adapted to contact with bell 71. Such lever is also provided with a portion 74$^a$, projecting into the path of movement of a coin in the carrier L. Lever 73 is provided with a striker at its lower end which is adapted to actuate bell 70 and is formed with projecting portion or arm 73$^a$, with which the edge of a coin in carrier L will engage. A latch 77 is pivotally secured to dog 75, as at 78, and is provided with a hook 79 and a curved portion 80. Hook 79 engages lever 73 at 73$^b$ when the lever is shifted forwardly by the carrier during the downward movement of the carrier. A spring 81, conveniently secured to dog 75, holds latch 80 normally against lever 73 and forces hook 79 into position to hold the lever 73 forwardly of its normal position. Springs 82 and 83 hold the striker-levers in normal position. Spring 84 holds the dog 75 normally in the path of the coin in the carrier L. The operation of the last-described signal-operating mechanism will be as follows: Assuming the parts to be in normal position (shown in Fig. 9) and a coin of proper size to have been placed within the carrier L, upon moving the carrier downwardly the projecting edge of the coin in the carrier will engage the teeth 75$^a$ of dog 75 and will also engage arm 74$^a$ of the striker-lever 74. As the coin passes beneath such curved portion the striker-lever will be released and forced by spring 83 to bring the striker at its end into contact with bell 71. During such downward movement the coin will also engage arm 73$^a$ of striker-lever 73 and shift such lever forwardly sufficiently to cause hook 79 of latch 77 to retain said lever in forward position, as clearly seen in Fig. 10 of the drawings. As the lever is returned to normal position by spring 37 the forward edge of the carrier will engage the upper curved portion 80 of the latch 77 and withdraw hook 79 from engagement with the striker-lever 74 and release such lever. Such release will cause the striker-lever 73 to spring forwardly and actuate bell 70. Thus it will be seen that during the downward movement of the carrier the bell 71 will be actuated and during the upward movement of the carrier the bell 70 will be actuated. In the drawings separate bells have been shown, since it is sometimes desirable to employ bells of different tones. Manifestly, however, the levers 73 and 74 may be adapted to cause a striker 70 to contact with the same bell if it is deemed desirable to employ such. While the construction shown is adapted to receive circular coins, it will be understood that the construction can be readily adapted to receive other tokens in lieu thereof, and the term "coin" is used herein in a broad sense to denote all forms of tokens.

The invention possesses numerous advantages. It will be seen that electrical connections are entirely dispensed with and the construction is "mechanical" throughout. A coin of insufficient thickness or diameter will not operate either of the signal devices. The shift of the coin in the carrier is manually effected, and the coin is shifted positively by the user of the telephone to actuate a signal-operating device. There is a clear distinction between the several signals employed for the coins of different denominations. By employing a manually-shifted carrier the signal transmitted to the operator at the central station is clear and loud. It is impossible to retract the carrier when the coin therein has been brought into engagement with the toothed dog, and such construction prevents a repeated operation of the signal by the same coin. By constructing the carrier so the edge of the coin will engage the operating part of the signaling device a coin of less than acceptable size will not cause a signal to be transmitted. The wings on the carrier-lever prevent coins or slugs from being inserted through the slot wherein the lever travels or the coin-slot except when the lever is in normal position. The case can be readily secured to any desired part of the telephone when the drawer is removed and cannot be removed except when the coin-drawer has been withdrawn. The construction of the carrier is simple and inexpensive. By employing notches 46 in the carrier the coin is securely held, with a portion of the coin exposed for direct engagement with a signal-operating part. The inclination of the carrier is such that a coin will always rest upon the bottom plate of the carrier, and the stop in the coin-channel will consequently only retain coins of the desired thickness in position to actuate the signal-operating device. All defective or improper coins will be rejected and returned to the depositor.

The resultant construction and arrangement generally is a very compact one, and a device adapted for use with the maximum number of coins of different denominations is of convenient size to be secured to an ordinary telephone.

While I have shown and described the improved sound-yielding body H, I do not wish to be understood as claiming such feature in this apparatus, since it forms a part of the subject-matter of an application filed by me February 20, 1901, Serial No. 48,138.

While the invention is shown as applied to a device in which a series of carriers are employed, it is manifest that certain features may be employed in an apparatus wherein but a single carrier is used. The invention is not to be understood to be restricted to the details shown and described, but may be varied within wide limits without departing from the spirit of the invention. So, also, the features thereof may be employed severally without adoption in entirety.

Having thus described the invention, what I claim as new, and desire to secure by Letters Patent, is—

1. A toll apparatus for telephones comprising the combination with a case and a signal device, of a carrier pivotally sustained therein, a coin channel or guide in said carrier, a stop sustained by the carrier and located in said channel or guide and arranged to hold only a coin or token of acceptable size in position in said carrier to effect the actuation of said signal device when said carrier is shifted, said channel or guide being formed so as to permit a coin or token of less than acceptable size to pass therethrough, an exit leading to the outside of the case and means for directing the coins or tokens of less than acceptable size to said exit and whereby coins or tokens of less than said acceptable size will be returned to the depositor, and means whereby said carrier may be shifted.

2. A toll apparatus for telephones comprising the combination with a case, of a series of carriers movably mounted in said case, each of said carriers being provided with a coin channel or guide wherein a coin or token of acceptable size will be held, and wherethrough a coin or token of less than acceptable size will pass, an exit, and a guide for directing the coins or tokens passing through all of said coin-channels, to said exit leading to the outside of the case, and whereby coins or tokens of less than acceptable size will be returned to the depositor, and means whereby said carriers may be shifted.

3. A toll apparatus for telephones comprising the combination with a case, of a coin channel or guide in said case, and an adjustable stop arranged in said channel or guide in position to retain only a coin or token of acceptable thickness and diameter in said channel or guide, and arranged to permit a coin or token of less than said size to pass through the channel or guide without being held therein.

4. A toll apparatus for telephones comprising the combination with a case and a signal device, comprising an actuating part therefor, of a movably-sustained carrier whereinto a deposited coin or token will fall, and whereby the coin or token will be shifted to shift said actuating part, means sustained by said carrier and whereby the coin will be held in said carrier said actuating part being yieldingly held in the path of movement of a coin or token held in said carrier, and shifted thereby, said carrier being movable in one direction to shift the coin or token to shift said actuating part, and to discharge the coin or token therefrom, and means whereby said carrier may be shifted.

5. A toll apparatus for telephones comprising the combination with a case, a sound-producing device and an actuating part therefor, of a pivotally-sustained carrier whereinto a deposited coin or token will pass, and whereby the coin or token will be shifted to shift said actuating part, said actuating part being yieldingly held in the path of movement of a coin held in the carrier and engaged thereby, and along and beyond which the coin will pass, said carrier being movable in one direction to shift the coin or token to shift said actuating part and to discharge the coin or token therefrom, and means whereby the carrier may be shifted.

6. A toll apparatus for telephones comprising the combination with a case, and a signal device comprising a yielding part, of a pivotally-sustained carrier, whereinto a coin or token will be deposited, and whereby the coin or token will be shifted to shift said yielding part, said yielding part being held in the path of movement of a coin or token in said carrier and shifted thereby, the shift of said yielding part by said coin serving to actuate said signal device and means whereby said carrier may be shifted.

7. A toll apparatus for telephones comprising the combination with a case, and a signal device comprising a yielding part, of a pivotally-sustained carrier, whereinto a coin or token will be deposited, and whereby the coin or token will be shifted to shift said yielding part, said yielding part being held in the path of movement of a projecting edge of a coin or token in said carrier and shifted thereby, the shift of said yielding part by said coin serving to actuate said signal device and means whereby said carrier may be shifted.

8. A toll apparatus for telephones comprising the combination with a case and a signal device comprising an actuating part therefor, of a pivotally-sustained carrier whereinto a coin or token will be deposited, and whereby the coin or token will be shifted to shift said actuating part, said actuating part being yieldingly held in the path of movement of a coin or token held in said carrier and shifted thereby, said carrier having a movement in one direction to shift the coin or token to engage said actuating part to cause the actuation of said signal device and beyond engagement with said part to discharge the coin or token, whereby said actuating part will be first shifted and the coin or token discharged thereafter, during the movement of the carrier in one direction, and means whereby said carrier may be shifted.

9. A toll apparatus for telephones comprising the combination with a case and a signal device comprising an actuating part therefor, of a pivotally-sustained carrier whereinto a coin or token will be deposited, and whereby the coin or token will be shifted to shift said actuating part, said actuating part being yieldingly held in the path of movement of a projecting edge of a coin or token held in said carrier and shifted thereby, said carrier having a movement in one direction to shift the coin or token to engage said actuating part to cause the actuation of said signal device and beyond engagement with said part to discharge the coin or token, whereby said actuating part will be first shifted and the coin or token discharged thereafter, during the movement of the carrier in one direction, and means whereby said carrier may be shifted.

10. A toll apparatus for telephones comprising the combination with a case and a signal device comprising a pivoted striker-lever provided with a part whereby said lever is shifted, of a pivotally-sustained carrier whereinto a coin or token will be deposited, and whereby the coin or token will be shifted, said part being yieldingly held in the path of movement of a coin or token held in said carrier, and shifted thereby, said carrier having a movement necessary to engage said part to actuate said signal device and to discharge the coin or token therefrom, and means whereby said carrier may be shifted.

11. A toll apparatus for telephones comprising the combination with a case and a signal device comprising a pivoted striker-lever provided with a part whereby said lever is shifted, of a pivotally-sustained carrier whereinto a coin or token will be deposited, and whereby the coin or token will be shifted, said part being yieldingly held in the path of movement of a projecting edge of a coin or token held in said carrier, and shifted thereby, said carrier having a movement necessary to engage said part to actuate said signal device and to discharge the coin or token therefrom, and means whereby said carrier may be shifted.

12. A toll apparatus for telephones comprising an oscillating coin-receiving carrier, means for oscillating the carrier to the extent required to discharge the coin therefrom, a device for producing an audible signal, and a movable striker having a part extending into the path of movement of the coin or token so as to result in the shift of the striker directly by said coin or token during the movement of the carrier which discharges the coin or token from the carrier.

13. A toll apparatus for telephones comprising an oscillating coin-receiving carrier, means for oscillating the carrier to the extent required to discharge the coin therefrom, a device for producing an audible signal, and a movable striker having a part extending into the path of movement of the projecting edge of a coin or token so as to result in the shift of the striker directly by said coin or token during the movement of the carrier which discharges the coin or token from the carrier.

14. A toll-collecting machine comprising an oscillating coin-receiving carrier, means for oscillating the carrier to the extent required to discharge the coin therefrom, a gong or sound-yielding body, and a suitably-applied movable hammer having an arm extending into the sweep of the toll-representing coin or token so as to result in the operation of the hammer directly by the said coin or token during the toll-discharging oscillation of the carrier.

15. A toll-collecting machine comprising an oscillating carrier for receiving the toll-representing coin or token edgewise, which carrier has its rear and forward side walls slotted, as at 46, from the upper edges of the side walls downwardly; means for oscillating the carrier; a gong or sound-yielding body, and a suitably-applied tiltable hammer having an arm extending into the sweep of the slotted portions of the aforesaid walls of the carrier so that a coin or check within the carrier shall come into engagement with the said hammer-arm at the slots in the aforesaid walls of the carrier during the oscillation of the carrier into its toll-discharging position.

16. A toll apparatus for telephones comprising the combination with a case and a signal device, of a pivotally-sustained carrier whereinto a coin or token will be deposited and means therein whereby the deposited coin or token will be held with its upper portion exposed or projecting therefrom, said signal device comprising a part for causing its actuation located in the path of movement of said exposed or projecting upper portion, and arranged to be shifted thereby, when said carrier is shifted to actuate said signal device and discharge the coin or token.

17. In a toll apparatus for telephones the combination with a case, of a carrier pivotally mounted therein, a coin channel or guide in said carrier, said carrier having walls between which a coin or token will be held, a notch in the edges of said walls, a part for causing the operation of a signal located in the path of movement of a portion of a coin or token adjacent said notch and in said carrier, and a part whereby said carrier may be shifted.

18. In a toll apparatus for telephones, the combination with a case, of a carrier movably mounted therein, a coin channel or guide, in said carrier, said carrier having a top and bottom between which a coin will be held, a notch in said top and bottom, a part for causing the operation of a signal located normally in the path of movement of the portion of a coin adjacent said notch and in said carrier, and a part whereby said carrier may be manually shifted.

19. In a toll apparatus for telephones, the combination with a case, of a carrier movably mounted therein, a coin channel or guide in said carrier having sides, between which a coin will be held, a part for causing the operation of a signal located normally in the path of movement of the projecting edge of a coin or token in the carrier, and a part whereby said carrier may be manually shifted.

20. In a toll apparatus for telephones, the combination of a case, of a carrier pivotally mounted therein wherein a coin will be held and whereby the coin will be shifted, said carrier being held normally in inclined position so a coin or token therein will rest upon the bottom of the carrier, of a stop projected into the carrier for engaging part of the edge of a coin and beneath which a coin of insufficient thickness will pass, a signal device actuated by a coin held in the carrier when said carrier is shifted and means whereby said carrier may be shifted.

21. In toll apparatus for telephones, the combination with a case, of a carrier pivotally mounted therein, a coin channel or guide formed in said carrier, said carrier having sides between which a coin or token will be held, and being held normally in an inclined position, a lever located normally in the path of movement of the projecting edge of a coin in the carrier, for causing the operation of a signal, and a part whereby said carrier may be manually shifted.

22. In a toll apparatus for telephones, the combination with a case, of a movable carrier comprising top and bottom plates, and sides between which a coin will be held, and a stop sustained by the carrier and for positioning the coin in said carrier, and a signal-operating part in the path of movement of a coin in said carrier, and a part whereby said carrier may be manually shifted to effect the shift of the coin.

23. In a toll apparatus for telephones, the combination with a case, of a shaft secured therein, a carrier pivotally sustained thereby and comprising top and bottom plates between which a coin or token is held, said plates being bent at an angle and having the said cross-shaft extended therethrough, a signal-operating part arranged to actuate a signal when the coin or token is in the carrier and in position to be engaged by a coin or token in said carrier, and a suitable part whereby said carrier may be manually shifted.

24. In toll apparatus for telephones, the combination with a case, of a carrier pivotally sustained therein, a part arranged to cause the operation of a signal when a coin or token has been placed in said carrier and when said carrier is shifted, a lever projected through a slot in the case for shifting said carrier, and wings on said lever or carrier for closing said slot in the case.

25. In a toll apparatus for telephones, the combination with a case, of a carrier pivotally sustained therein, a part arranged to cause the operation of a signal when a coin or token has been placed in said carrier and said carrier is shifted, a lever for shifting said carrier and a wing on said lever or carrier, a slot in said case for receiving a coin or token, said wing being arranged to obstruct said slot when the carrier is shifted from normal position.

26. In toll apparatus for telephones, the combination with a case, of a carrier pivotally sustained therein, a part arranged to cause the operation of a signal when a coin or token has been placed in said carrier and when said carrier is shifted, a lever projected through a slot in the case for shifting said carrier, a wing or wings on said lever or carrier for closing said slot in said case, and a slot in said case for receiving a coin, said wing being arranged also to close said receiving-slot when the carrier is shifted from normal position.

27. In toll apparatus for telephones, the combination with a case, of a carrier pivotally held therein, a part whereby said carrier may be shifted, a dog for preventing the retraction of said carrier, and a signal-operating part arranged to actuate a signal when a coin has been deposited in the carrier and said carrier is shifted.

28. In toll apparatus for telephones, the combination with a case, of a carrier pivotally mounted therein, a coin-channel in said carrier wherein a coin will be held, a part whereby said carrier may be manually shifted, a toothed dog in the path of movement of a coin in said carrier and a part for causing the operation of a signal.

29. In a toll apparatus for telephones, the combination with a case, of a carrier pivotally sustained therein, a lever for shifting said carrier, a dog for preventing the retraction of the lever when a coin has been deposited therein, said dog being provided with a series of teeth, and pivotally sustained in the case, and a signal device actuated by a coin in the carrier.

30. In a toll apparatus for telephones, the combination with a case, of a carrier movably held therein, a part whereby said carrier may be manually shifted, a coin channel or guide in said carrier, and a vibratory actuating part projecting into the path of movement of a coin in said carrier and a sound-producing body actuated by said part.

31. In toll apparatus for telephones, the combination with a case, of a carrier pivotally held therein, a part whereby said carrier may be manually shifted, a coin channel or guide in said carrier, a striker-lever sustained in manner which permits its vibration, said lever having a part projecting into the path of movement of a coin in said carrier, and a signal actuated by said lever.

32. In a toll apparatus for telephones, the combination with a case, of a series of carriers, a cross-shaft sustained in the case and whereby said carriers are pivotally sustained, means whereby said carriers may be shifted, and one or more signal mechanisms actuated by coins or tokens held in the carriers when said carriers are shifted.

33. In toll apparatus for telephones, the combination with a case, of a cross-shaft secured therein, a series of carriers separately pivoted upon said cross-shaft, each of said carriers being provided with a coin channel or guide wherein a coin will be held, and one or more signal devices comprising a part arranged to actuate a signal when a coin is within a carrier and a carrier is shifted.

34. In a toll apparatus for telephones, the combination with a case, of a series of carriers, a cross-shaft sustained in the case and whereby said carriers are pivotally sustained, means whereby said carriers may be shifted, one or more signal devices and a cross-rod whereby one or more of the actuating parts of said devices are sustained.

35. In a toll apparatus for telephones, the combination with a case, of a series of carriers, a cross-shaft sustained in said case and whereby said carriers are pivotally sustained, each of said carriers being arranged normally in position so as to retain a coin or token in position therein with the upper portion of the coin or token exposed or projecting upwardly, and a signal-actuating part for each of said carriers located in the path of said exposed or projecting portion and one or more signal devices actuated thereby.

36. In a toll apparatus for telephones, the combination with a case, and a carrier whereby a deposited coin will be shifted, of a signal device comprising a striker-lever for actuating a signal, a detent engaging said lever and for retaining said lever in shifted position, said lever being arranged to be shifted by a coin in said carrier, said detent being arranged to be shifted by the carrier to effect the release of said lever to actuate said signal device.

37. In toll apparatus for telephones, the combination with a case, of a carrier movably held therein and a signal device comprising a lever arranged to be shifted by a coin in said carrier, a detent for retaining said lever in shifted position, said detent being arranged to be shifted by said carrier, and a spring for shifting said lever to actuate a signal when said latch is shifted to release said lever.

EDWARD P. BAIRD.

Witnesses:
FRED GERLACH,
TORRIS H. ALFORDS.